United States Patent [19]

Lowe et al.

[11] Patent Number: 5,259,671
[45] Date of Patent: Nov. 9, 1993

[54] GREASED JOURNAL BEARING ASSEMBLIES WITH THERMAL ISOLATION AND COOLING IN CONTINUOUS MIXERS OF PLASTIC MATERIALS

[75] Inventors: Ian Lowe, Chadderton Oldham; Darren G. Rhodes, Hopwood Heywood, both of England; William H. Swilling, Jr., Shelton; Michael R. Kearney, Milford, both of Conn.

[73] Assignee: Farrel Corporation, Ansonia, Conn.

[21] Appl. No.: 712,198

[22] Filed: Jun. 7, 1991

[51] Int. Cl.⁵ .............................................. B01F 7/08
[52] U.S. Cl. .................................... 366/83; 366/147; 366/349
[58] Field of Search .......................... 366/83–85, 366/64, 97, 297, 298, 300, 301, 144, 147, 22, 348, 394, 601, 318, 323

[56] References Cited

U.S. PATENT DOCUMENTS

| | | | |
|---|---|---|---|
| 1,953,295 | 4/1934 | Garbutt | 366/147 |
| 2,700,533 | 1/1955 | Miller | 366/147 |
| 3,723,039 | 3/1973 | Matsuoka et al. | 366/84 |
| 3,802,670 | 4/1974 | Okada et al. | 366/84 |
| 3,829,067 | 8/1974 | Matsuoka | 366/84 |
| 3,923,291 | 12/1975 | Matsuoka et al. | 366/84 |
| 4,154,535 | 5/1979 | Maillefer | 366/144 |
| 4,310,251 | 1/1982 | Scharer et al. | 366/77 |
| 4,575,256 | 3/1986 | Armitage et al. | 366/323 |
| 4,647,215 | 3/1987 | Armitage et al. | 366/323 |
| 4,695,240 | 9/1987 | Li et al. | 366/85 |
| 4,951,884 | 8/1990 | Koenig | 366/318 |

FOREIGN PATENT DOCUMENTS

1199721  7/1970  United Kingdom ................ 366/147

OTHER PUBLICATIONS

Sales Information Booklet, CP-45, "C" Series, Mar. 1982 by Farrel Machinery Group of Emhart Corp. First Perspective Drawing, Second Perspective Drawing (in color) Capsule Specifications-Farrel Processor (CP-45), All engineering drawings, particularly 605-00026 and 605-00018, and specification, pp. 1–9 at rear of Booklet.

Primary Examiner—Chris K. Moore
Assistant Examiner—James F. Hook
Attorney, Agent, or Firm—Parmelee, Bollinger & Bramblett

[57] ABSTRACT

Continuous mixers of plastic materials are equipped with greased journal bearing assemblies instead of bulky, expensive, pumped circulating-oil lubricating systems, usually involving oil-cooling heat exchangers with circulating water. Such pumped oil systems having traditionally been employed in the past for lubricating journal bearings of the two rotors in such mixers. Novel thermal isolation of the journals for the two rotors separates their bearing assemblies from the severe heat being generated during mixing of plastic materials by continuous rotation of the two rotors within the mixer barrel. Localized cooling provides heat sinks for the drive and driven journals of each rotor. The rotors are shown as three-piece assemblies with drive and driven journals separate from the main rotor body. Beneficial interactions of localized cooling for the drive and driven journals plus thermal isolation of the journals from the severe heat being generated in the mixer barrel advantageously enables the journal bearing assemblies to be lubricated by grease instead of by circulating oil. Each of the journal bearing assemblies shown and described comprises two axially spaced, spherical-type roller bearings each encircling a portion of a journal and each being equipped with a seal housing having a grease fitting. The outer races of these roller bearings are shown and described as mounted in respective end frames which are spaced farther away from the upstream and downstream ends of the mixer barrel than their usual spacing in the past.

8 Claims, 8 Drawing Sheets

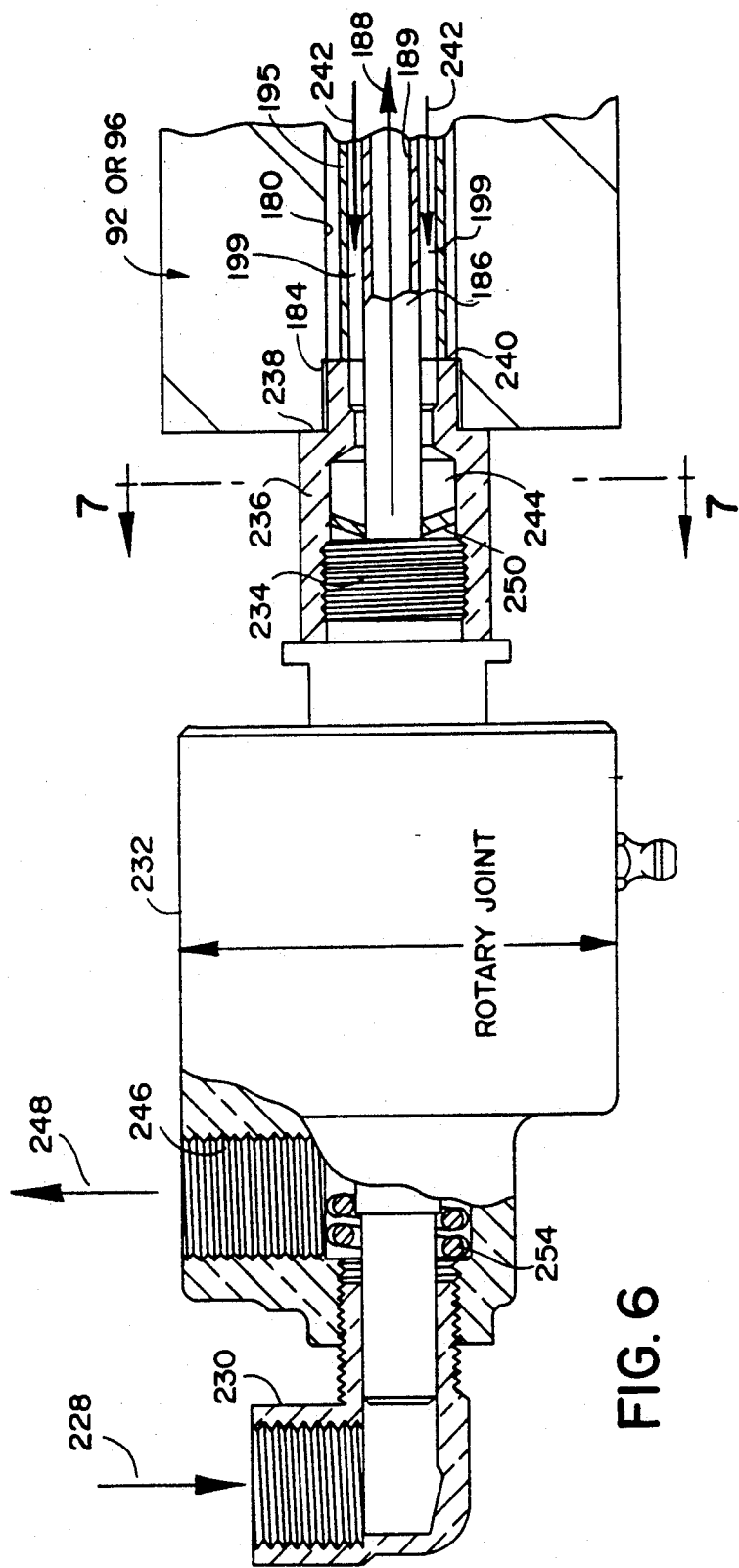
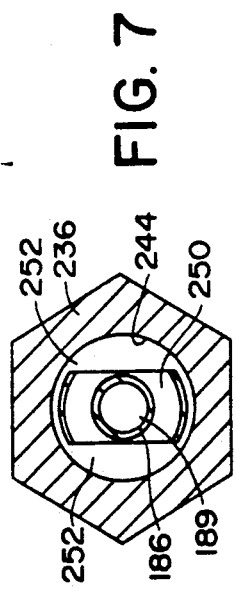
FIG. 6
FIG. 7

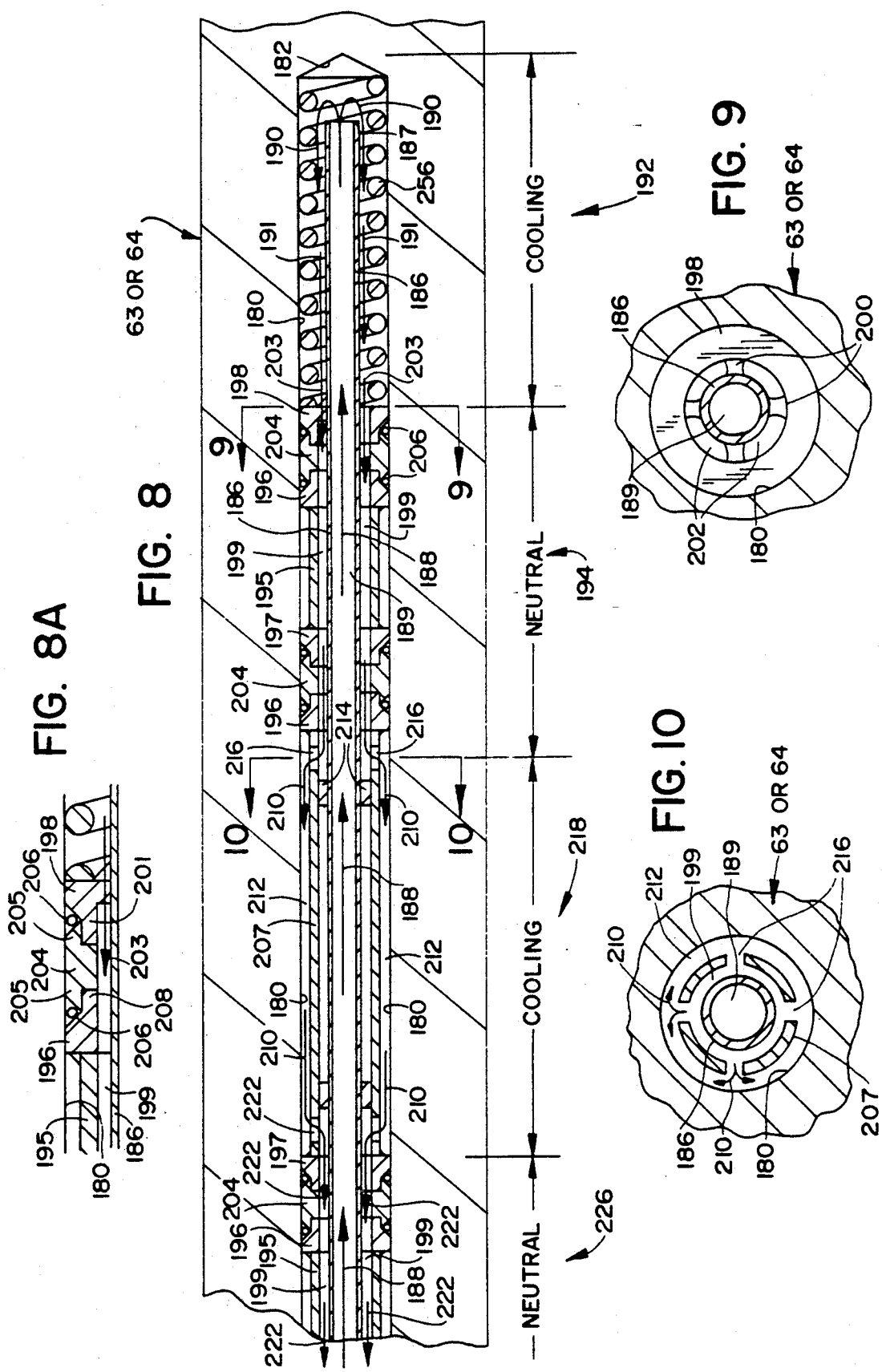

GREASED JOURNAL BEARING ASSEMBLIES WITH THERMAL ISOLATION AND COOLING IN CONTINUOUS MIXERS OF PLASTIC MATERIALS

FIELD OF THE INVENTION

The present invention is in the field of two-rotor continuous mixers of plastic material. More particularly, this invention relates to a method and apparatus for lubricating the drive and driven journal bearings in such a continuous mixer by employing the beneficial interactions of localized cooling for the drive and driven journals plus thermal isolation of the journals from the heat being generated in the mixer barrel during mixing of plastic materials by continuous rotation of the two rotors in plastic materials in a mixing chamber within the mixer barrel.

BACKGROUND

A two-rotor continuous mixer of plastic materials has a mixer barrel for housing a mixing chamber having an in-feed location near an upstream end of the mixing chamber and an outlet near a downstream end of this chamber. Ingredients for plastic materials to be mixed are introduced into the in-feed location. Continuous turning of the two rotors within the mixing chamber causes the plastic materials to move downstream in the mixing chamber from the in-feed to the outlet. Resulting mixed molten plastic materials flow out of the outlet. Considerable amounts of heat are generated around the two rotors continuously turning in their mixing of plastic materials within the mixing chamber. The heat being generated is more severe near the downstream end of the mixing chamber as compared with the upstream end.

Each of the two rotors in prior art continuous mixers is a one-piece steel member of elongated configuration having a drive journal for the upstream end of the rotor and a driven journal for the downstream end of the rotor. The drive and driven journals of the two rotors are rotatably supported in drive and driven journal bearing assemblies, respectively, located upstream and downstream relative to the mixing chamber.

In the prior art, in order to lubricate the journal bearing assemblies while at the same time counteracting the severe heating effects being imposed upon the main rotor section of each one-piece rotor in the mixing chamber, oil traditionally has been circulated for lubricating the journal bearing assemblies. This circulating oil has been cooled, usually by pumping the oil through heat exchangers cooled with circulating water. The overall results of traditional cooled-oil circulation systems with their oil pumps, filters, oil reservoirs or sumps, oil lines and associated interconnections and hardware, heat interchangers with plumbing for circulating cooling water, mounting framework, electrical conduits, shut-off switches and circuit breakers, etc. are bulky, expensive lubricating systems, which consume electrical power each day for running oil pumps and which often involve some unpleasant ambient noise caused by continuous operation of their oil pumps and which must be maintained.

SUMMARY

It is an object of the present invention to overcome or substantially avoid the problems associated with oil circulation systems traditionally used for lubrication of journal bearing assemblies in two-rotor continuous mixers of plastic materials.

Another object of the invention is to enable greased journal bearings to be installed and used day-in and day-out for commercial operation of two-rotor continuous mixers of plastic materials.

Novel thermal isolation of the journals for the two rotors is provided. Each rotor, as shown and described in an illustrative embodiment of the invention, comprises a three-piece assembly having a main rotor body section as a central component with a drive journal and a driven journal each being separate components located at upstream and downstream ends, respectively, of the main rotor body section. Moreover, localized cooling provides heat sinks for the drive and driven journals.

The beneficial interactions of localized cooling for the separate drive and driven journals, plus thermal isolation from the severe heat being generated around the main rotor body sections as it is continuously turning within plastic materials inside the mixing chamber, enable journal bearing assemblies to be lubricated by grease instead of by the traditional cooled-oil circulation systems. Each of the journal bearing assemblies shown and described comprises two spherical-type roller bearings having their inner races encircling axially spaced portions of a journal, with their outer races mounted in an end frame which is separated from the mixer barrel and each equipped with a seal housing having a grease fitting. The two end frames as shown are spaced farther from the upstream and downstream ends of the mixer barrel than relatively smaller spacings of end frames in prior continuous mixers having one-piece rotors.

In accordance with the present invention in one embodiment there is provided a method of lubricating a plurality of bearings in drive and driven bearing assemblies of a two-rotor continuous mixer of plastic materials comprising the steps of: injecting grease into the respective bearings in the drive and driven bearing assemblies which are rotatably supporting drive and driven journals, respectively; thermally insulating the driven journal of each rotor as a separate component of the rotor being separated from a main rotor section forming another component of the rotor; providing liquid coolant flow along a significant portion of a wall of a bore in the driven journal for cooling the driven journal; and providing a heat sink for the drive journal by directing liquid coolant flow against an end wall of a bore in the main rotor section positioned further toward an upstream end of the main rotor section than a downstream boundary of packing encircling an upstream end of the main rotor section.

BRIEF DESCRIPTION OF THE DRAWINGS

The invention, together with further objects, features, advantages and aspects thereof will be more clearly understood from the following description considered in conjunction with the accompanying drawings which are not necessarily drawn to scale with the emphasis instead being placed upon clearly illustrating the principles of the invention. Like reference numerals indicate like parts throughout the different views.

FIG. 3A is placed immediately at the left of FIG. 3B (with slight overlap between FIGS. 3A and 3B for clarity of illustration). FIG. 3, comprising FIGS. 3A and 3B taken together, shows a longitudinal sectional view of the continuous mixer taken along the plane 3—3 in FIG. 4 extending along the axis of one of its two mixing rotors, namely, the one seen at the left in FIG. 4. FIGS. 3A and 3B show both of the bearing housing assemblies for the driven and drive journals, respectively, which advantageously are separate pieces from the rotor body itself.

FIG. 6 is an elevational view, shown partially in section, of a mechanism for circulating liquid coolant into a coolant feeding tube (sometimes called a "siphon tube" in the plastic mixer industry) extending into a bore of a rotor in the continuous mixer and for discharging the returning liquid.

FIG. 7 is a cross-sectional view taken along the plane 7—7 in FIG. 6, showing a stop for the coolant feed tube.

FIG. 8 is a longitudinal elevational view taken along the axis of a rotor body showing a novel tubing arrangement for providing alternate cooling and neutral zones positioned along the bore of the rotor body. An inner coolant feed tube and concentric outer tubes associated with circulation diversion plugs produce the alternating cooling and neutral zones. The positioning and relative lengths of the cooling and neutral zones can readily be changed by removing the coolant feed tube and its associated outer tubes and then inserting a second set of such tubes arranged to provide different coolant circulation paths as desired. Such different coolant circulation paths are produced by altered positions of the various diversion plugs in the second set of such tubes. The rotor body is schematically illustrated for clarity in section in FIG. 8 as a straight cylindrical member.

FIG. 8A is an enlargement of part of FIG. 8.

FIG. 9 is an enlarged cross-sectional view taken along plane 9—9 in FIG. 8.

FIG. 10 is an enlarged cross-sectional view taken along plane 10—10 in FIG. 8.

DETAILED DESCRIPTION OF PREFERRED EMBODIMENTS

Figure 1:
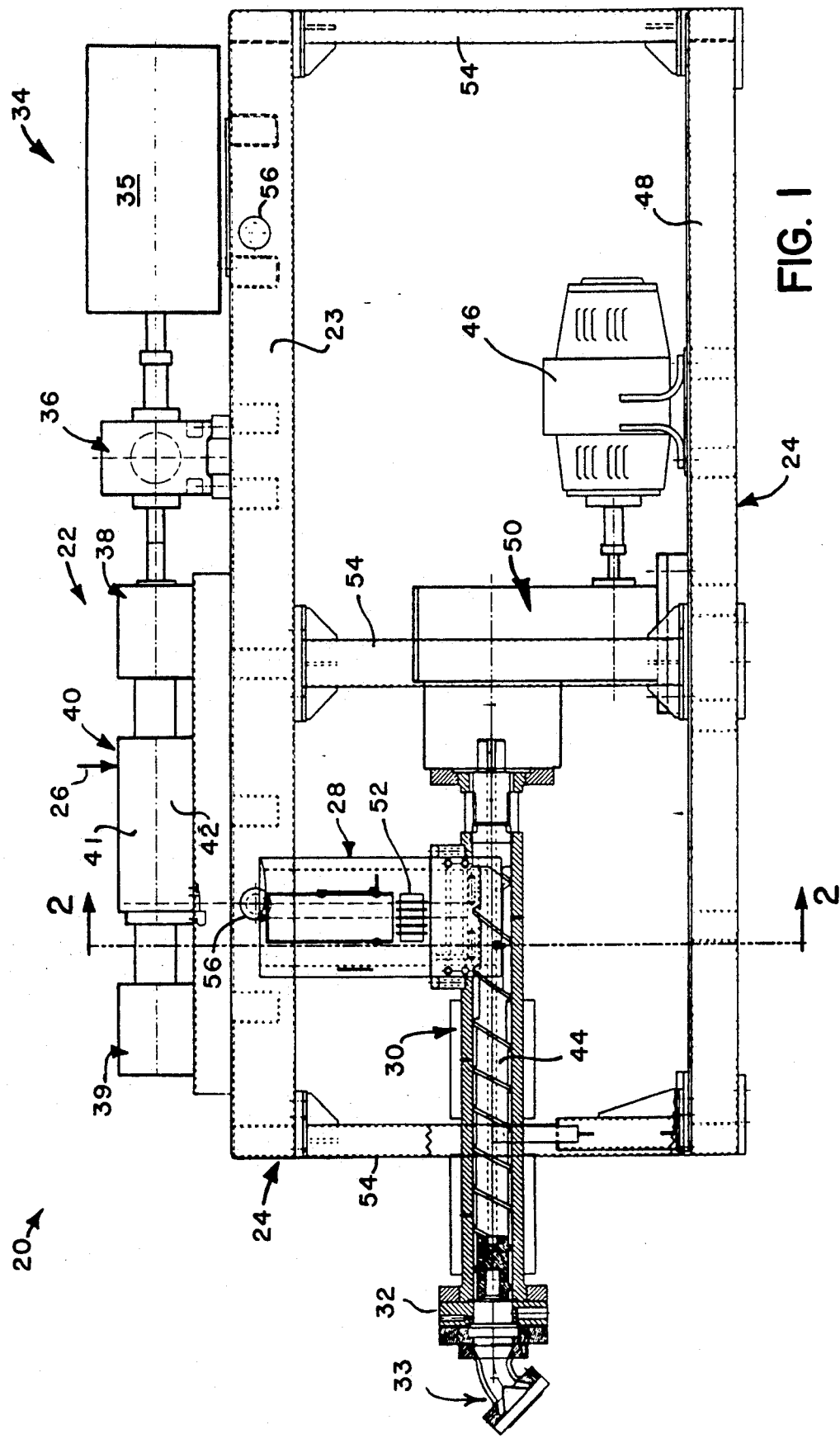
FIG. 1 is a side elevational view of a compact processor for plastic materials comprising a unitized mixing and extrusion system. This compact processor system comprises a two-rotor continuous mixer supported on an upper level of a framework for compounding and mixing plastic materials as desired by the user. The resultant molten plastic materials are discharged from the continuous mixer and descend like a "rope" through a chute into a hot-fed extruder supported on an intermediate level of the framework with a drive motor for the extruder being mounted on a base of the framework.

With reference to FIG. 1, there is shown a compact processor 20 for plastic materials and comprising a unitized mixing and extrusion system that allows a user to customize mixing and extrusion of plastic materials being processed. This unitized processor system comprises a two-rotor continuous mixer 22 mounted on an upper level 23 of a framework 24. Plastic materials, fillers, additives, colorants, and the like, as desired by the user, namely, various ingredients desired to be mixed with plastic materials, are introduced into a feed entrance (sometimes called a "feed throat") of the continuous mixer 22 as indicated by an arrow 26. The resulting molten plastic materials flow by gravity down from the continuous mixer 22 like a molten "rope" descending within a vertical chute 28 into a hot-fed extruder 30. The output from the extruder 30 issues through an extruder head 32 adapted to have various types of an extrusion device 33 mounted thereon, as may be desired by the user.

For driving two rotors in the mixer 22, there is shown a suitable drive system 34, for example such as a d.c. drive motor 35 arranged with suitable feedback speed and torque controls, as known in the art, for turning the mixer rotors preferably at predetermined constant speed. This motor 34 is coupled to a suitable speed-reducer 36, for example such as an all helical gear speed-reducer with two output shafts coupled to two three-piece rotors for rotating the two rotors in opposite directions about their respective longitudinal axes. In this illustrative example, the two rotors are turned in opposite directions at the same rotational rate (same R.P.M.).

The mixer 22 includes a drive end frame 38 (also called a "drive bearing housing assembly") for rotatably supporting a drive end journal (not seen in FIG. 1). This drive end frame 38 and its journal will be described in detail later. The mixer includes a driven end frame 39 (which may be called the "water end frame" and also may be called "driven bearing housing assembly") for rotatably supporting a driven end journal (not seen in FIG. 1). The driven end frame 39 and its journal also will be described in detail later. Mounted between drive and driven end frames 38, 39 is a mixer chamber barrel or housing 40 including an upper half 41 and a lower half 42.

For driving an extruder feed screw 44 (FIG. 1) in the hot-fed extruder 30, there is shown an electric motor 46 mounted on a base 48 of framework 24. This motor 46 is coupled through a suitable speed-reducer transmission 50 to the extruder screw 44.

Figure 2:
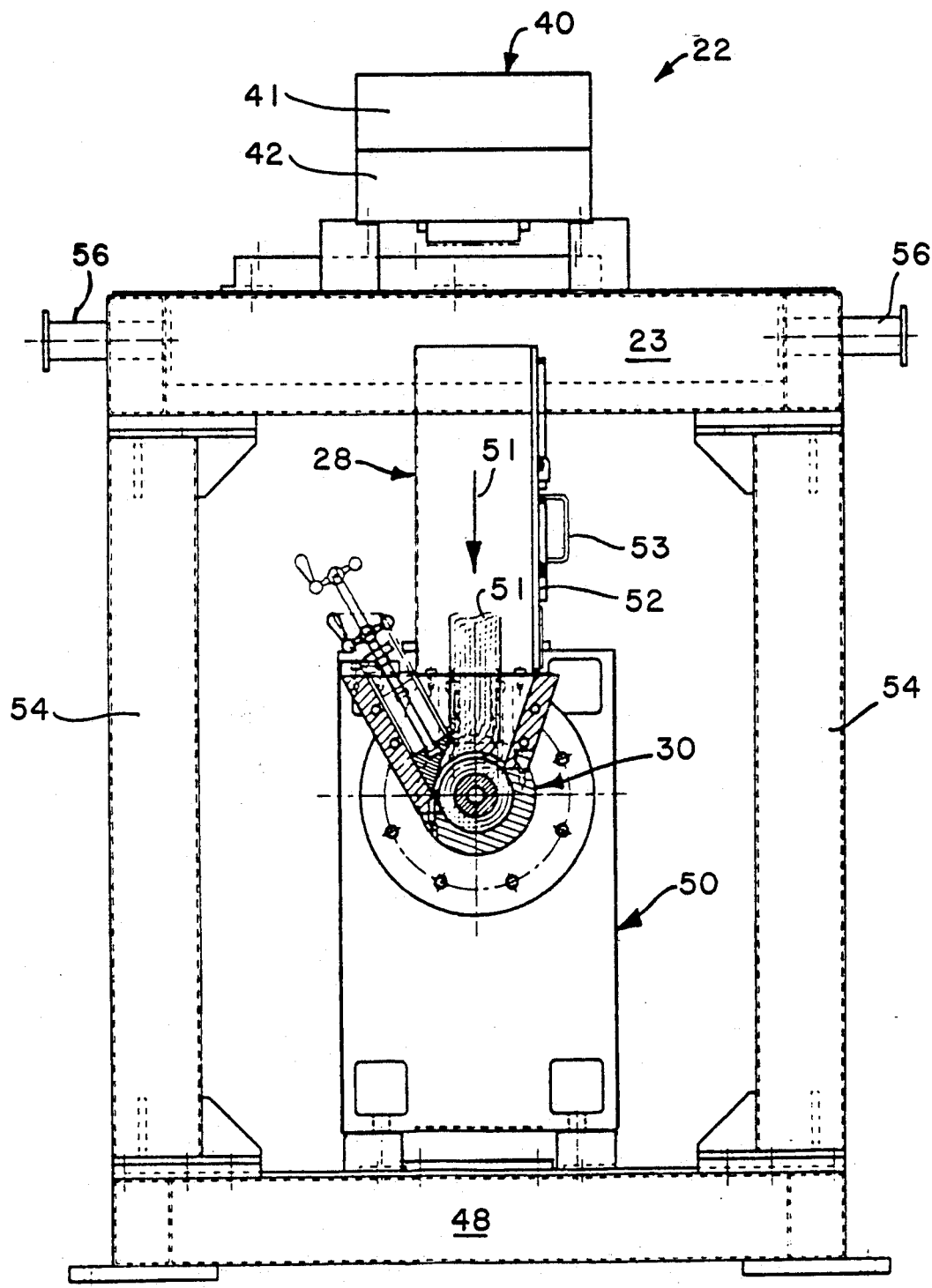
FIG. 2 is an enlarged cross-sectional elevational view of the compact processor of FIG. 1 taken along the plane 2—2 in FIG. 1.

Molten plastic materials 51 (FIG. 2) are discharged from the mixer 22 and descend through the connecting chute 28 having a grate-guarded access window 52 (FIG. 1) permitting viewing and temperature sensing of molten plastic materials moving down through this chute. An access door in the chute 28 can be opened by a handle 53 (FIG. 2). The hot-fed extruder 30 extrudes the plastic materials 51 out through the extrusion device 33 mounted on the extruder head 32.

The framework 24 is a unitized structure including six upright frame members 54, three on each side, rigidly interconnecting the upper level 23 and base 48. The upper frame level 23 and base 48 include transverse beams at suitable locations for supporting the machinery and for stiffening the whole framework 24. For convenience in transporting and installing this unitized framework 24, there are four lifting lugs 56 projecting from the outside of the upper frame level 23, two on each side.

CONVENIENT ACCESS FOR CLEAN-OUT AND MAINTENANCE OF MIXING CHAMBER AND BOTH ROTORS IN TWO-ROTOR CONTINUOUS MIXERS FOR PLASTIC MATERIALS

Figure 3A:
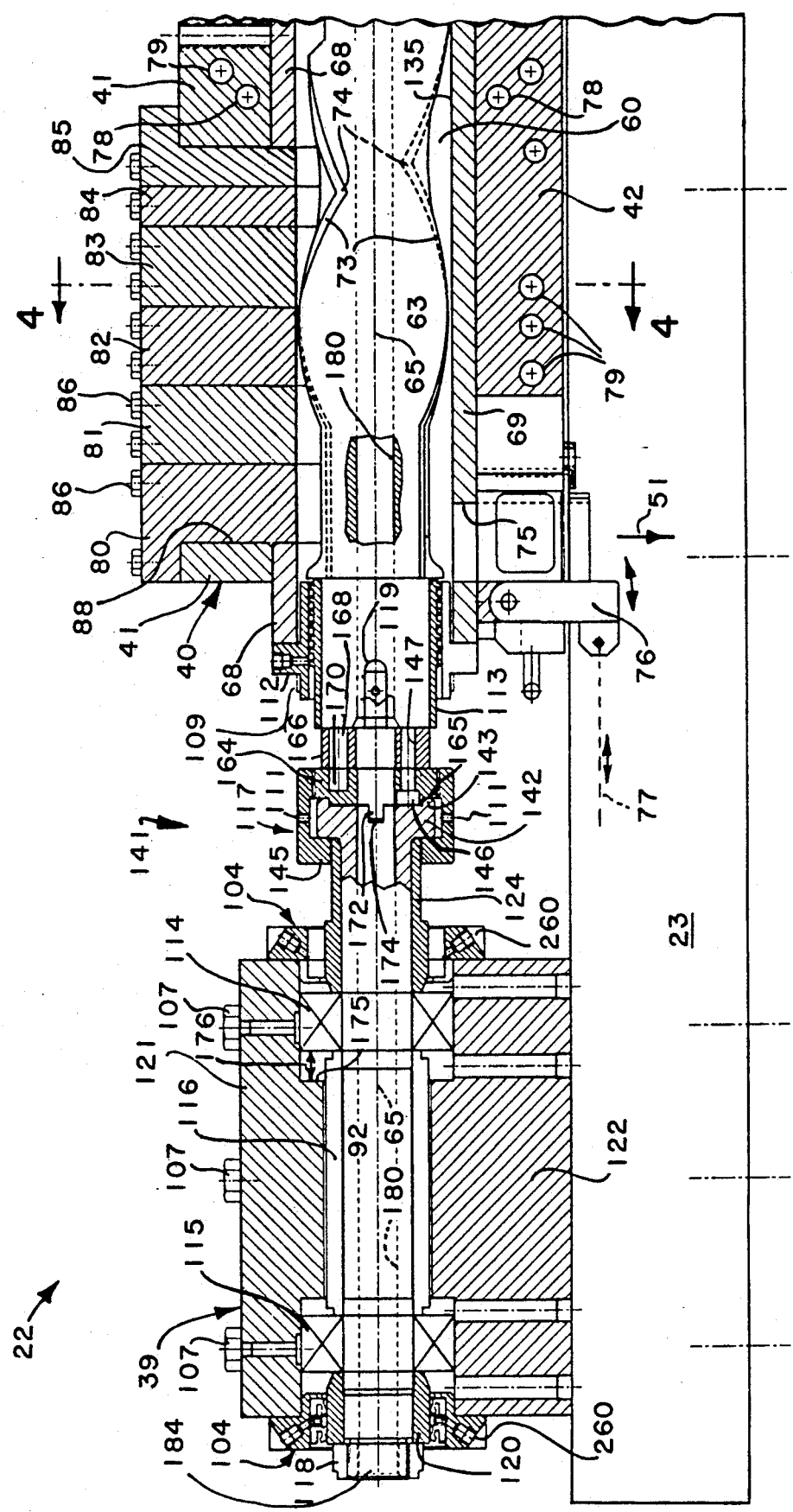
FIGS. 3A and 3B form FIG. 3. For forming FIG. 3.
Figure 3B:
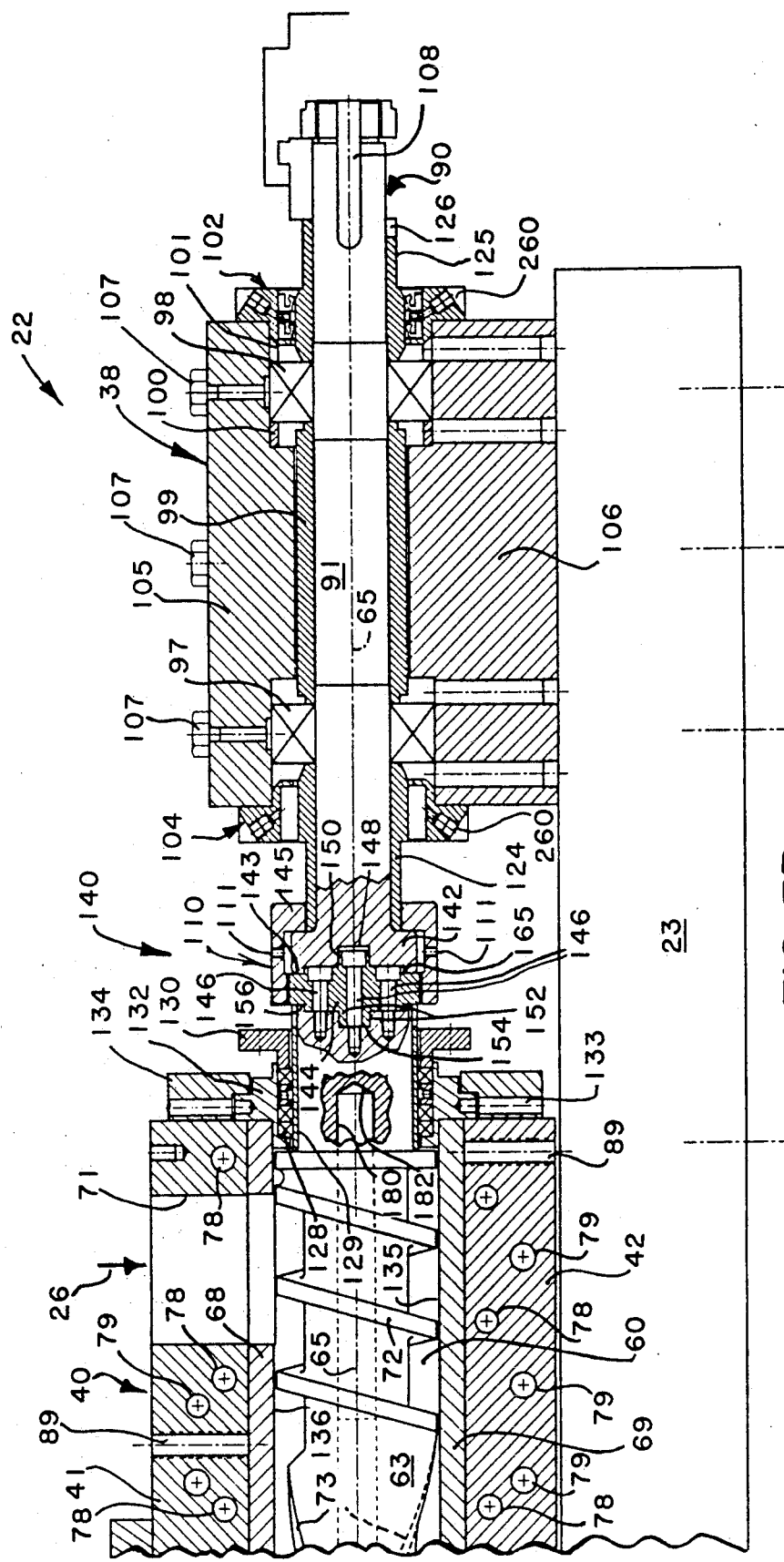
Figure 4:
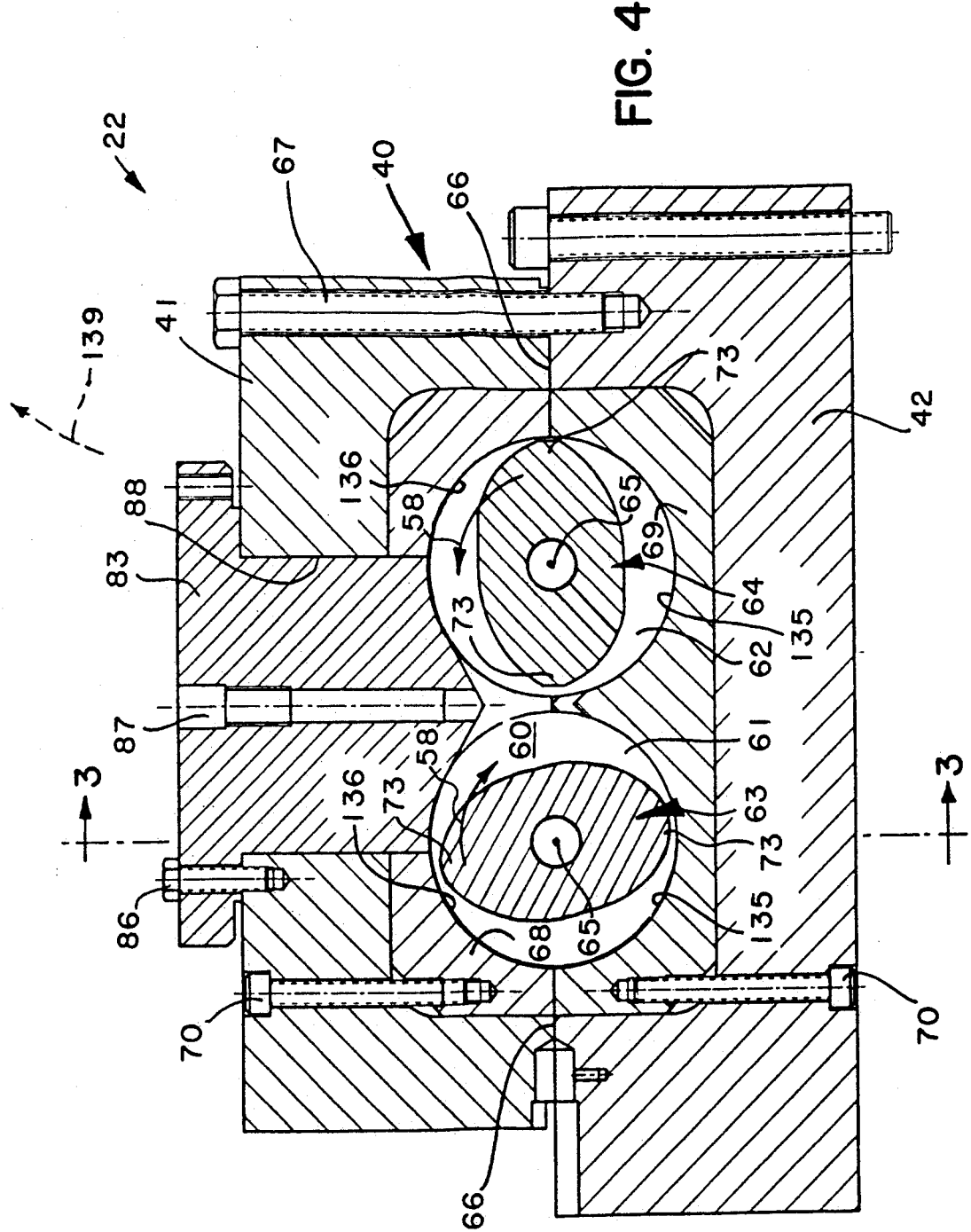
FIG. 4 is a cross-sectional view taken along the plane 4—4 in FIG. 3A showing mixing wing portions of two rotor bodies in a mixing chamber.

Reference will be made to FIGS. 3A, 3B, 4 and 5 for describing and explaining the present invention embodied in the two-rotor continuous mixer 22 for providing quick, convenient access into an openable mixing chamber 60 for clean-out of the mixing chamber and its two rotors and for maintenance. As seen in FIG. 4, the openable mixing chamber 60 comprises two generally cylindrical cavities 61 and 62 communicating with each other along the center of the mixer barrel 40. First and second rotor bodies 63 and 64 (also called "rotor sections" or "rotors") are mounted in their respective cavities 61 and 62 for rotation about their axes of rotation 65 as shown by arrows 58. The mixing chamber barrel 40 (also called the "mixing chamber housing") incorporates a horizontal split line 66, and the upper and lower halves 41, 42 of the barrel 40 are hinged together, as is known in the art, such that the upper barrel half 41 can be swung upwardly in clam-shell manner away from the lower barrel half 42 after removal of barrel-closure screws, such as machine screw 67 (FIG. 4).

The mixing chamber 60 is defined by upper and lower liners 68 and 69, which are held captive by screws 70 (FIG. 4) within the respective upper and lower halves 41 and 42 of the chamber barrel 40.

As seen in FIG. 3B, the mixer barrel 40 has a feed entrance or feed throat 71 extending down through upper barrel half 41 and liner 68. Plastic materials and ingredients are introduced through this feed entrance 71, as indicated by arrow 26 so as to enter the mixing chamber 60. Only the rotor body 63 is seen in FIGS. 3A and 3B, and it is to be understood that each rotor body 63 and 64 (FIG. 4) includes a generally helical screw flight 72 (FIG. 3B) having a plurality of turns for pushing plastic materials downstream, i.e. toward the left, in FIGS. 3A and 3B. Each rotor body 63 and 64 also includes a plurality of mixing wings 73 (seen more clearly in FIG. 3A), each mixing wing 73 having a cusp 74. The resultant molten plastic materials 51 are discharged from an outlet or orifice 75 located at the downstream end of the mixer barrel 40. This discharge orifice 75 extends from the mixing chamber 60 down through lower liner 69 and lower barrel half 42.

In order to control discharge of molten plastic materials 51 from discharge orifice 75, there is a swingable orifice gate 76 adjustably moved by a mechanical connection 77. For controlling temperatures of the upper and lower halves 41 and 42 of the mixer barrel 40, there are water cooling passages 78 and passages 79 for cartridge heaters. For regulating mixing dynamics, there are a plurality of removable and interchangeable inserts 81, 82, 83, 84 of various thicknesses removably held by machine screws 86 (FIG. 4). As shown in FIG. 4, non-removable end inserts 80 and 85 and removable inserts 81–84 may include a port 87 for venting volatiles or for injecting additives. These inserts 80–85 are mounted in an access opening 88 extending down through the upper barrel half 41 and liner 68. There are liner jacking screw holes 89 (FIG. 3B) which are used for removing liners 68 and 69 from the respective barrel halves 41 and 42.

The rotor body 63, as seen in FIGS. 3A and 3B, is the central section of a three-piece rotor assembly 90 comprising a drive journal 91 (FIG. 3B), a driven journal 92 (FIG. 3A), with the rotor body 63 being positioned between its drive and driven journals 91, 92 and having its rotational axis 65 aligned with corresponding rotational axes 65 of the drive and driven journals 91, 92. At this point in the description it will be helpful to look at FIG. 5 showing the whole three-piece rotor 90 including the rotor body 63 located between its drive and driven journals 91 and 92.

Figure 5:
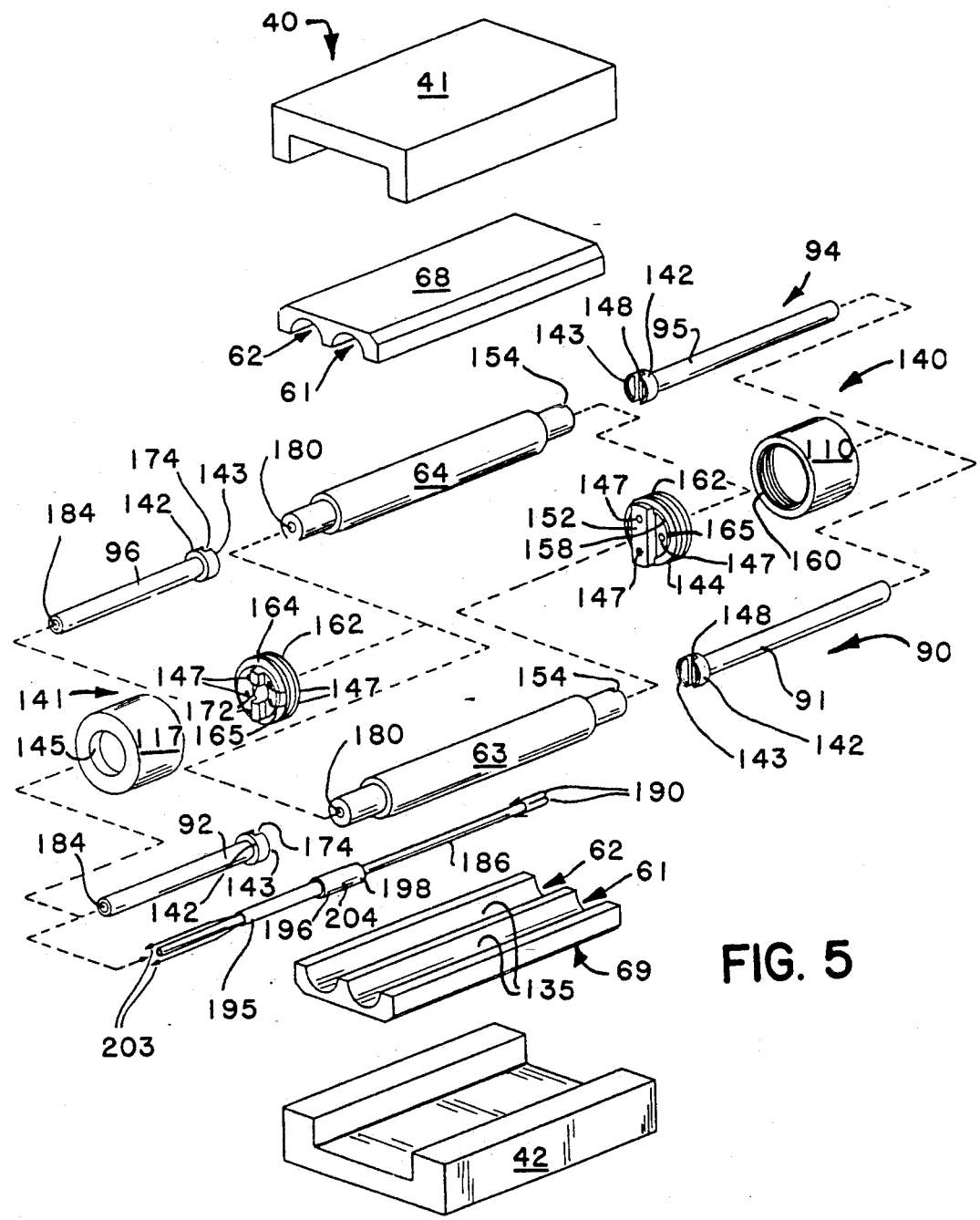
FIG. 5 is a diagrammatic perspective view illustrating various novel components of the two-rotor continuous mixer for purposes of explanation.

In FIG. 5 it is seen that the second rotor body 64 is the central section of a second three-piece rotor assembly 94 comprising a second drive journal 95, a second driven journal 96, with the second rotor body 64 being positioned between its drive and driven journals 95, 96 and having its rotational axis 65 (FIG. 4) aligned with corresponding rotational axes of the drive and driven journals 95, 96.

The first and second drive journals 91 and 95 (FIG. 5) are rotationally supported in spaced parallel relationship in the drive end frame 38 by axially spaced spherical roller bearings 97, 98 having a bearing spacer sleeve 99 between them. The outer race of bearing 98 is held in an axially fixed position in the end frame 38 by an annular spacer 100 seated against an annular shoulder in the end frame 38 and by an extension 101 on a seal housing 102. Consequently, the two bearings 97, 98 are held axially fixed in their respective positions in the end frame 38. There is also a seal housing 104 for the other bearing 97. The top portion 105 of the end frame 38 can be removed from the bottom portion 106 along a split line (not shown) horizontally aligned with the axis 65 by removal of machine screws 107.

For transmitting torque from the two output shafts of the speed-reducer transmission 36 (FIG. 1) to the first and second drive journals 91 and 95 (FIG. 5), each of these drive journals is keyed, as shown in FIG. 3B at 108, to a respective one of the two output shafts of transmission 36.

The first and second drive journals 91 and 95 are disengageably coupled to the first and second rotor bodies 63 and 64, respectively, as will be explained in detail later by torque-transmitting coupling means including a loosenable locking collar 110 having spanner wrench ports (not shown) and set screws 111.

At the downstream end of the mixing chamber barrel 40, the rotor body 63 is encircled by a visco seal assembly including an outer sleeve 112 and an inner sleeve 113 having a helically convoluted outer surface. By virtue of the fact that each of the rotors 90 and 94 (FIG. 5) is made in three pieces, the visco seal 113 for each rotor body advantageously can be installed as shown as a non-split part encircling each rotor body, thereby saving considerable expense and complexity. There is a cut-out 119 in the downstream end of each rotor body for receiving a key for keying the seal sleeve member 113. A hose clamp 109 encircles a projecting lip on the visco seal outer sleeve 112. With prior art one-piece rotors it was necessary to construct visco seal assemblies using split parts so that they could be installed on each one-piece rotor. The downstream ends of the first and second rotor bodies 63, 64 are disengageably coupled to their respective first and second driven journals 92 and 96 (FIG. 5) as will be explained in detail later by coupling means including another loosenable collar 117 having spanner wrench ports (not shown) and set screws 111.

The first and second driven journals 92, 96 are rotationally supported in spaced parallel relationship in the driven end frame 38 by axially spaced spherical roller bearings 114 and 115 separated by a bearing spacer sleeve 116. It is noted that the outer race of each of the bearings 114 and 115 for each of the driven journals 92 and 96 (FIG. 5) is free to shift in an axial direction within the driven end frame 39 for accommodating thermal expansion and contraction of both three-piece rotor assemblies 90 and 94 (FIG. 5). There are seal housings 104 (FIG. 3A) for the bearings 114 and 115. A lock nut 118 holds seal ring 120, bearings 115 and 114 with their spacer 116 and seal ring 124 which abuts an enlarged journal head 142 on each driven journal 92 and 96 (FIG. 5). A top portion 121 of the driven end frame 39 can be removed from the bottom portion 122 along a split line (not shown) horizontally aligned with the axis 65 by removal of machine screws 107.

There is a seal ring 124 (FIG. 3A) near the bearing 114 and a similar seal ring 124 (FIG. 3B) near the bearing 97. A seal ring 125 (FIG. 3B) near the bearing 98 includes a notch 126 for providing clearance for a key (not shown) fitting in the keyway 108. At the upstream end of the mixer chamber barrel 40, there is suitable packing 128 (FIG. 3B), for example graphite-impregnated braided packing, associated with a packing seal wear sleeve 129 and being compacted by a packing gland 130 fastened by machine screws (not shown) to a packing gland retainer 132 held by a clamp 134. Alignment of retainer 132 is assured by a dowel pin 133 as it is inserted through a locating hole in clamp 134.

With reference to FIG. 5, it is noted that only two loosenable collars 110 and 117 are shown. It will be understood that actually there are two drive-end collars 110 and also two driven-end collars 117. Only one of each is illustrated in FIG. 5 in order to avoid confusing complexity in this FIG. 5.

When the user wishes to clean out the mixing chamber 60 and to clean the first and second rotor bodies 63, 64 or wishes to perform maintenance on these parts, the first and second rotor bodies 63, 64 are conveniently uncoupled respectively from their first and second drive journals 91, 95 and from their first and second driven journals 92, 96. In other words, four shaft connections are uncoupled, thereby separating each of the rotors 90 and 94 (FIG. 5) into its three separate components. There is sufficient spacing between the drive bearing assembly 38 and the upstream end of the mixing chamber barrel 40 and also sufficient spacing between the driven bearing assembly 39 and the downstream end of the mixing barrel 40 that both of the rotors 90 and 94 can be uncoupled into their three separate components, without opening the mixing barrel 40, if so desired.

Upon opening this barrel 40 in clam-shell manner as shown by the curved arrow 139 (FIG. 4), both of the uncoupled rotor body sections 63 and 64 can be lifted out, thereby providing convenient, unimpeded access to the entire inner surfaces 135 of the two cavities 61, 62 in lower liner 69. In addition, there is unimpeded access to the entire inner surface 136 of the upper liner 68 which is fully exposed by clam-shell opening 139 (FIG. 4) of the barrel 40. Since the uncoupled rotor bodies 63 and 64 now have been lifted out of the way, there is a convenient opportunity for removing and replacing the lower liner 69, if desired. The removed rotor bodies 63 and 64 easily can be handled and moved to a nearby cleaning or maintenance area in the plant. The bearing assemblies in the drive and driven end frames 38 and 39 advantageously can remain fully assembled, i.e. can remain essentially undisturbed, when the rotor body sections 63 and 64 are uncoupled from their respective journals and lifted out of the mixer chamber barrel 40.

QUICK-DISCONNECT COUPLINGS

For providing convenient, quick-disconnection capabilities for the three-piece rotors 90 and 94 (FIG. 5) novel quick-disconnect couplings 140 and 141 are incorporated in the two-rotor continuous mixer 22. In FIG. 5 only one drive-end coupling 140 and only one driven-end coupling 141 are shown for clarity of illustration. It will be understood that actually there are two of each such coupling.

These quick-disconnect couplings provide the following features:

(a) Piloted engagement for maintaining concentric alignment of the rotational axes of each rotor body and its drive and driven journals.

(b) Keyed connections for transmission of powerful torque.

(c) Ease of quick coupling and uncoupling.

(d) Integrity of strong connections is maintained.

(e) Couplings are bolted to the rotor bodies at both of the ends of each rotor body, thereby creating complete, functional, main rotor body assemblies. These couplings can remain bolted in their respective positions assembled with the rotor bodies 63 and 64 when the uncoupled rotor bodies are lifted out of the opened mixer barrel.

(f) The disengageable interface between each coupling and each journal is provided with both pilot and key.

(g) Concentricity and torque capabilities are built into the quick-disconnect coupling assemblies.

(h) Threaded locking collars are captive around the journals and serve to lock the coupling interfaces together.

(i) Joint integrity is maintained by pre-loading the threaded locking collars with a spanner wrench utilizing wrench ports provided.

(j) The threaded locking collars do not become jammed onto their screw threads, because all of the powerful torque involved is carried by keyed engagements at the interfaces.

(k) For disassembling the three-piece rotors 90 and 94, the user conveniently merely loosens and backs off the threaded locking collars and then removes the rotor bodies with their couplings by separation at the piloted and keyed interfaces.

Shown in FIG. 3B is one of the two drive-end, quick-disconnect couplings 140. The threaded locking collar 110 is held captive on the drive journal 91 by an inner flange 145 overlapping behind an enlarged head or flange 142 on the drive journal 91. This enlarged head 142 has a concentric circular piloting rim or lip 143 projecting in the downstream direction forming a cup-like socket interface on the drive journal head 142. A circular cylindrical rotor pilot 144 is shown bolted onto the upstream end of the rotor body 63 by four machine screws 146 (only three are seen) inserted through bolt holes 147 (FIG. 5) in the pilot 144. This pilot 144 has an upstream concentric annular piloting surface shown snugly fitting plug-like into the piloting lip 143 forming the socket interface on the drive journal head 142. The pilot 144 also has a diametrically-extending key 150 projecting in the upstream direction engageable into a mating diametrically-extending keyway 148 in the downstream surface of drive journal head 142.

In addition to its upstream key 150, the pilot 144 also has a downstream diametrically-extending key 152 (FIG. 5) shown engaged into a mating diametrically-extending keyway 154 in the upstream end surface of the rotor body 63. The upstream end surface of the rotor body 63 has a concentric circular piloting rim or lip 156 projecting in the upstream direction. The pilot 144 has a downstream concentric annular piloting surface 158 (FIG. 5) snugly fitting plug-like within the piloting lip 156, as seen in FIG. 3B.

The locking collar 110 is internally screw threaded at 160 (FIG. 5) for engagement with external screw threads 162 (FIG. 5) on the pilot 144. The joint interface between the pilot 144 and the downstream surface of the journal head 142 is compressively pre-loaded by tightening the locking collar 110 using a spanner wrench.

Attention is now invited to the quick-disconnect coupling 141 (FIG. 3A) located near the downstream end of the mixer barrel 40. It is seen that the locking collar 117 has an inner flange 145 overlapping behind an enlarged head or flange 142 on driven journal 92, thereby keeping this collar captive on the driven journal. The enlarged head 142 has a concentric circular piloting rim or lip 143 projecting in the upstream direction forming a cup-like socket interface on journal 92.

A circular cylindrical rotor pilot 164 (FIG. 3A) is bolted onto the downstream end of the rotor body 63 by four machine screws 146 (only one is seen) inserted through bolt holes 147 (FIG. 5) in the pilot 164. Interposed between the pilot 164 and the downstream end of the rotor body 63 is a thermal insulation ring 166 for reasons explained later. Four bolt holes 147 in this insulating ring are aligned with bolt holes 147 (FIG. 5) in the pilot 164. In addition to the four machine screws 146, two torque-transmitting drive pins 168 (only one is seen) project from the downstream end of the rotor body 63 through suitable holes in the insulation ring 166 and engage in sockets 170 (only one is seen) in the pilot 164. Less torque load at the driven end (compared with the drive end) allows use of drive pins 168 as keying means for the pilot 164.

The pilot 164 has a downstream concentric annular piloting surface 165 (FIG. 5) shown snugly fitting plug-like within the piloting lip 143 forming the socket interface on the driven journal head 142. The pilot 164 also has a diametrically-extending key 172 projecting in a downstream direction engageable onto a mating diametrically-extending keyway 174 in the enlarged head 142 of the driven journal 92. It is noted that there is an axial bore through the pilot 164 for reasons to be explained later on, and thus the key 172 is seen in FIG. 5 comprising two radial portions.

In operation, when the user wishes to uncouple the two rotor bodies 63, 64 (FIG. 5) from their respective drive and driven journals 91, 92 and 95, 96 (FIG. 5), the four locking collars 110, 117 are backed off from the screw threads 162 on the respective two drive-end pilots 144 and two driven-end pilots 164 by using a spanner wrench. The screw threads of the locking collars do not become jammed, because torque loading advantageously is borne solely by the drive keys 150 and 152 at the upstream (drive) ends of the rotor bodies 63 and 64. At the downstream (driven) ends of these rotor bodies, torque loading advantageously is borne solely by the two drive pins 168 and the key 172.

After the locking collars 110 and 117 have been backed off, the driven journals 92 and 96 (FIG. 5) are shifted downstream for providing end-play clearance by sliding the free-floating outer races of bearings 114, 115 (FIG. 3A) downstream within the driven end frame 39. There is about one-half inch of free-floating clearance from an annular shoulder 175 within end frame 39, as indicated by the double-headed arrow 176 (FIG. 3A). Such downstream shifting by about one-half inch of the driven journals 92 and 96 withdraws lip 143 of driven journal head 142 from its encircling relationship around annular piloting surface 165 (FIG. 5) of pilot 164 and also allows the rotor bodies 63, 64 to be shifted downstream about one-quarter inch. This downstream shifting of the rotor bodies 63, 64 withdraws the annular piloting surface of the upstream rotor pilot 144 (FIG. 3B) from its plug-like engagement within the previously encircling lip 143 of drive journal head 142. Thus, the rotor bodies 63, 64 now have become completely uncoupled from their prior concentricity piloting by the drive and driven journals.

Then, the rotor bodies 63 and 64 are conveniently lifted up out of the lower liner 69; key 150 easily slides upwardly, thereby freeing it from its keyway 148; also key 172 easily slides upwardly, thereby freeing it from its keyway 174.

The upwardly lifted rotor bodies 63, 64 are now completely removed from the mixer barrel 40. The inner surfaces 135 of mixing cavities 61, 62 in the lower liner 69 are fully exposed for unimpeded clean-out and/or maintenance. Advantageously, there was no need to disassemble either of the bearing assemblies in the end frames 38, 39. In other words, these bearing assemblies remain essentially undisturbed. Moreover, pilots 144, 164 remain fully assembled on the upstream and downstream ends of their respective rotor bodies. These rotor bodies 63, 64 are fully available for unimpeded clean-out and/or maintenance.

ROTOR ZONE COOLING METHOD AND APPARATUS

This rotor zone cooling method and apparatus enables predetermined zones of the two rotors in a two-rotor continuous mixer to be cooled as may be desired and enables other predetermined zones to remain "neutral", i.e. without significant cooling. Although the present embodiment of the invention is shown installed and employed in three-piece rotors, it is to be understood that this invention also can be installed and employed to advantage in one-piece rotors in two-rotor continuous mixer machines.

An unusually long axial bore 180 (FIG. 3A) is fabricated in each of the rotors 90 and 94 (FIG. 5). This bore 180 extends from the downstream end (also called the "water end") of the rotor all of the way to a terminal end 182 (FIG. 3B) of the bore. This terminal end 182 is shown positioned within the portion of the rotor which is encircled by packing 128. In fact, this terminal end 182 of the bore 180 is shown in FIG. 3B to be located upstream beyond the upstream end of the mixer barrel 40 and its liners 68, 69. This terminal end 182 of the bore 180 is shown axially spaced less than about one inch from the downstream ends of pilot-mounting machine screws 146. The entrance 184 to the bore 180 is shown in FIG. 3A at the downstream end of the rotor, and this entrance 184 is also seen at the downstream end of each rotor 90 and 94 in FIG. 5.

In order to feed liquid coolant, usually water, into the unusually long bore 180 of the rotor, there is an elongated coolant feed tube 186 (FIG. 8) which is shown extending to within less than one inch of the bore terminus 182. Liquid coolant flows, as shown by arrows 188, through the passage 189 defined by this tube 186. This feed tube 186 and all of the other components seen in FIG. 8 rotate with the rotor, as will be explained in detail later, and so there is no relative motion between any of the components seen in FIG. 8. The coolant does flow relative to these various components, as will be explained. The coolant 188 exits, as shown by flow arrows 190, from the discharge end 187 of the feed tube 186 and bathes bore terminus 182 and the wall surface of rotor bore 180 for providing an effective cooling flow 191 within the rotor in a first cooling zone 192.

For creating a first neutral zone 194, the flow of coolant 191 which was travelling exposed to the wall of rotor bore 180 is now channeled into the interior of a first isolation tube section 195. This isolation tube section 195 is supported in concentric relationship with the feed tube 186 by being welded to a pair of support rings 196 and 197 each of whose perimeters rests against the wall of rotor bore 180. For supporting the feed tube 186 concentric within the bore 180, there is a spider support ring 198 (FIG. 9) whose perimeter rests against the wall of rotor bore 180. This spider ring 198 has a plurality (four are shown) of inwardly extending radial legs 200 (FIG. 9) welded to feed tube 186. Thus, four flow passages 202 are defined between these radial legs 200. The spider 198 is spaced from the nearest isolation tube support ring 196 by a rabbeted ring fitting 204 having a circumferential shoulder 205 (FIG. 8A) overlapping an axially projecting lip 201 on the spider 198. The ring fitting 204 generally has a broad T-shape as seen in cross-section in FIG. 8A, with a second circumferential shoulder 205 overlapping an adjacent axially projecting lip 208 on the support ring 196. For providing a V-shaped groove to receive a seal 206, for example an O-ring or a lip seal, adjacent portions of the spider 198 and fitting 204 are chamfered, as seen more clearly in FIG. 8A. Similarly, for providing another V-shaped groove for holding another such seal 206, adjacent portions of the fitting 204 and support ring 196 are chamfered.

This pair of seals 206 engaging the wall of rotor bore 180 causes coolant flow to divert away from the bore wall and to go through spider passages 202 (FIG. 9) as shown by arrows 203 (FIG. 8). After the flow 203 has gone through spider passages 202, it is confined within an isolation channel 199 inside tube section 195. This isolation tube section 195 is spaced inwardly from the rotor bore wall; thus essentially no rotor cooling occurs within first neutral zone 194.

The cooling/neutral/cooling/neutral, etc. tubing assembly technique, a portion of which is shown enlarged in FIG. 8A, uses a T-shaped fitting 204 with circumferential shoulders 205 overlapping lips on adjacent support rings. This advantageous technique is employed repeatedly along the length of the rotor bore 180. Thus, in accord with this assembly technique, the support ring 197 has a configuration which is a mirror image of the other support ring 196 for isolation tubing section 195. The support ring 197 is assembled with its lip underlapping a shoulder on a second T-shaped ring fitting 20 which in turn has its other shoulder overlapping a lip on an adjacent tubing support ring 196. Another concentric tubing section 207 is supported by the second support ring 196 and is spaced inwardly from the wall of rotor bore 180.

However, the function of this tubing section 207 is opposite in action from the isolation tubing section 195, because this tube section 207 acts as a cooling augmentation (cooling booster) element by forcing a coolant flow 210 closely adjacent to the wall of rotor bore 180. For causing coolant to flow, as shown by arrows 210, in the annular channel 212 close to bore wall 180, there is an annular plug 214 encircling and welded to feed tube 186. Also, there are a plurality of ports 216 (four ports are shown in FIG. 10) in the cooling augmentation tube section 207. Relative to coolant flow 203 within cooling isolation channel 199 in tube section 195, these ports 216 are located slightly upstream of plug 214, thereby causing flow to divert, as is shown by arrows 210, into cooling augmentation channel 212. Consequently, a second rotor cooling zone 218 is created.

At the downstream end of this cooling zone 218, the augmentation tube section 20 includes another plurality of radial ports 220 for allowing inward flow (arrows 222) into another cooling isolation channel 199 within another isolation tube section 195. An assembly of a T-shaped fitting 204 and adjacent tubing support rings 197 and 196 with a pair of bore-wall-engaging seals 206 causes the coolant to be diverted inwardly (arrows 222) from cooling augmentation channel 212 into cooling isolation channel 199. Thus, a second neutral zone 226 is provided.

Consequently, it will be understood that a sequence of alternating cooling/neutral/cooling/neutral/cooling/neutral zones can be provided including zones of various possible lengths and with various possible numbers of alternating zones. When a user wishes to change the relative positions, the relative lengths or the number of these zones, then the whole assembly of coolant feed tube 186, together with its associated cooling isolation tube sections 195 and cooling augmentation tube sections 207, is removed from the rotor bore 180 and is replaced by another coolant feed tube assembly providing the desired new channeled flow patterns.

Thus, the user is provided with versatility in arranging patterns of the cooling and neutral zones, their relative locations along the bore of each rotor, their relative lengths and number of such zones, thereby having the opportunity to tailor or customize these zones to various compositions of plastic materials with various mixing temperature requirements in various regions along the length of a mixing chamber 60 (FIGS. 3A, 3B). For example, in a region near helical screw flight 72, pumping and feeding actions of plastic materials are occurring; then a significant amount of dispersive mixing often is occurring in a region of higher pressure downstream from the feedscrew 72 along upstream portions of mixing wings 73 upstream from cusps 74; and then a significant amount of distributive mixing often is occurring along downstream portions of mixing wings 73 downstream from cusps 74. The cooling and neutral zones advantageously can be patterned for optimizing the processing of plastic materials desired to take place in the various regions along the lengths of the rotors.

In order to supply coolant 228 (FIG. 6) into feed tube 186, there is an in-feed plumbing connection 230 leading into a rotary joint mechanism 232 as known in the art. This rotary joint mechanism 232 includes a rotatable coupling 234 with a screw-threaded connection into a tubular member 236 which has a shoulder 238 shown abutting against a driven journal 92 or 96 at the entrance 184 (FIG. 3A) into the bore 180 of the driven journal. This axial bore 180 in the driven journal communicates as seen in FIG. 3A with an axial bore hole in the pilot 164, which in turn communicates with an axial bore hole in the insulator ring 166, which in turn communicates with the rotor bore 180. Thus, there is a complete axial passage for insertion of the feed tube assembly 186, 195, 207 to extend from the entrance 184 (FIG. 3A) to the discharge end 187 (FIG. 8) of feed tube 186 near the bore terminus 182.

It is to be noted in FIG. 6 that an isolation tube section 195 is welded at 240 to the end of novel tubular member 236. Thus, a returning flow 242 within a final isolation channel 199 proceeds through an annular channel 244 in tubular member 236 and enters the coupling 234 which is rotatable in conformity with rotation 58 (FIG. 4) of the respective rotor assemblies 90, 94 (FIG. 5). The returning coolant flow in annular channel 244 passes through the rotary joint mechanism 232 and issues through an outlet 246 as shown by an arrow 248.

As shown in FIG. 7, a stop 250 has clearances at 252 for permitting returning coolant flow to by-pass this stop 250 in entering the coupling 234. A compression spring 25 is associated with the rotary joint mechanism 232. As seen in FIG. 8, another compression spring 256 seats against bore terminus 182 and presses against the spider ring 198 for compressively loading to hold in closely adjacent overlapping relationships all of the respective rabbeted joint assemblies involving the various ring fittings 204.

GREASED END FRAME BEARING ASSEMBLIES WITH THERMAL ISOLATION AND COOLING

Instead of employing the bulky and expensive pressurized circulating oil lubrication systems, customarily used for lubricating the journal bearings in two-rotor mixers for plastic materials, a novel system and method provides greased end frame bearing assemblies. By virtue of employing novel thermal isolation and novel localized cooling, high temperature grease is enabled to be used successfully in the journal bearing assemblies of two-rotor mixers for plastic materials embodying the present invention.

As shown in FIGS. 3A and 3B, the seal housings 104 at opposite ends of the driven-journal end frame 39 are equipped with lubrication grease fittings 260 for greasing bearings 114 and 115. Similarly, the seal housings 102 and 104 at opposite ends of the drive-journal end frame 38 are equipped with lubrication grease fittings 260 for greasing the bearings 98 and 97. In this illustrative two-rotor mixer 22, for example, the four bearings 98 and 97 (only two are seen in FIG. 3B) for the drive journals 91 and 95 (FIG. 5) are spherical-type roller bearings and also the four bearings 114 and 115 (only two are seen in FIG. 3A) for the driven journals 92, 96 are spherical-type roller bearings.

A suitable high-temperature grease is injected into the bearings through the grease fittings 260. For example, a suitable high-temperature grease which has been found to operate successfully in the present embodiment of the invention is commercially available from Davis-Howland Oil Corporation of Rochester, N.Y. under the mark "LUBRIPLATE 630-2".

In order to inhibit thermal conduction of heat from the mixer barrel 40 into the driven-journal end frame 39, a suitable thermal insulation ring 166 of relatively high compressive strength is interposed between the downstream end of each rotor body and the pilot 164. For example, a suitable heat insulation material having sufficient compressive strength for fabricating this thermal insulation ring 166 is asbestos-free "ZIRCAR" fibrous ceramic refractory, Type 100, commercially available from Zircar Products, Inc. of Florida, New York. This refractory insulation has a thermal conductivity in the range from about 4.40 to about 4.42 Btu per hour, degree F., square foot per inch of thickness. This thermal conductivity range occurs over a temperature range from about 390° F. to about 1,100° F.

In order to provide further thermal insulation at the location of the heat insulation ring 166, the four machine screws 146 and the two drive pins 168 extending through this ring are of stainless steel composition which offers considerably less thermal conductivity than customary steel screws and pins of the same size and shape.

Moreover, for providing additional thermal isolation of the bearings in driven-journal end frame 39 (FIG. 3A) from the mixer barrel 40, the rotor zone cooling described above is arranged for providing augmented cooling for at least a major portion of the length of the bore 180 of each driven journal 92, 96 to serve as a heat sink therein.

In order to provide thermal isolation and cooling for the drive-journal end frame 38 (FIG. 3B) from the mixer barrel 40, the rotor bore 180 is unusually long, as described above, with its terminus 182 being shown located farther upstream than the upstream end of the mixer barrel 40 and its liners 68, 69. In other words, this terminus 182 actually is shown located closer to the end frame 38 than the mixer barrel 40 and its liners 68, 69. There is an intense cooling action produced by the fresh coolant 188 (FIG. 8) issuing from the discharge end 187 of the feed tube 186 and striking the terminus 182 as shown by flow arrows 190. This effective cooling action by fresh coolant flow 188, 190 at a location very near to the upstream end of the rotor body serves as a heat sink for cooling the drive journals 91 and 95 (FIG. 5) and thus thermally isolates the drive-journal end frame 38 from the mixer barrel 40.

In addition, it is noted that each of the end frames 38, 39 is spaced relatively far from the mixer barrel 40 enabling some cooling action to occur by ambient air in the region between mixer barrel and respective end frames.

Since other changes and modifications varied to fit particular operating requirements and environments will become recognized by those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. In a two-rotor continuous mixer for plastic materials wherein each rotor includes an elongated main rotor section with a drive journal at one end of the main rotor section and a driven journal at the other end of the main rotor section and wherein the main rotor sections of the two rotors are rotated about their respective rotational axes in a mixing chamber defined within a mixer barrel and wherein the drive and driven journals are rotationally supported by drive and driven journal bearing assemblies, respectively, and wherein each of the drive and driven bearing assemblies includes a plurality of axially spaced bearings each having an inner and an outer race with rolling elements interposed between the inner and outer races and wherein the inner races of respective bearings encircle respective journals for rotational support thereof, the method of lubricating the plurality of bearings in the drive and driven journal bearing assemblies of each rotor comprising the steps of:

injecting grease into the respective bearings in the drive and driven bearing assemblies;

thermally insulating the driven journal from the main rotor section;

providing liquid coolant flow along a significant portion of a wall of a bore in the driven journal for cooling the driven journal;

providing a heat sink for the drive journal by directing liquid coolant flow in contact with an end wall of a bore in the main rotor section positioned farther toward said one end of the main rotor section than a boundary of a seal encircling said one end of the main rotor section;

making the driven journal as a first member;

making the main rotor section as a second member adapted to be coupled to and to be separated from the first member; and thermally insulating the driven journal from the main rotor section when the main rotor section is coupled to the driven journal by interposing between said members at least one mechanical element having lower thermal conductivity than either of said members.

2. In a two-rotor continuous mixer for plastic materials, the method of lubricating the plurality of bearings in the drive and driven journal bearing assemblies of each rotor as claimed in claim 1 comprising the further step of:

increasing the thermal insulation effect between the driven journal and the main rotor section by transmitting torque from said second member to said first member through a mechanical element having lower thermal conductivity than either of said members.

3. In a two-rotor continuous mixer of plastic materials wherein a first and second rotor each includes an elongated main rotor section with a drive journal located near one end of the main rotor section and a driven journal located near the other end of the main rotor section, and wherein the drive and driven journals are rotationally supported by drive and driven journal bearing assemblies, respectively, and wherein the drive and driven journal bearing assemblies include drive and driven end frames, respectively, and wherein each of the drive and driven journal bearing assemblies includes a plurality of axially spaced bearings each having an inner race encircling a respective one of the journals and each having an outer race supported in a respective end frame, with rolling elements interposed between the inner and outer races for rotationally supporting the inner race within the outer race, apparatus for enabling each rotor of the two-rotor continuous mixer to be commercially operated with such bearings being grease-lubricated, said apparatus comprising:

a grease fitting associated with each bearing for accommodating injection of grease as lubricant for the respective bearing;

said first rotor comprising a first main rotor section with a first drive journal and a first driven journal each being a component of the mixer separate from said first main rotor section and normally being in axial alignment with said one end and with said other end, respectively, of said first main rotor section;

said second rotor comprising a second main rotor section with a second drive journal and a second driven journal each being a component of the mixer separate from said second main rotor section and normally being in axial alignment with said one end and with said other end, respectively, of said second main rotor section;

a first thermal insulation element having significantly lower thermal conductivity than said first driven journal and said first main rotor section and being mechanically positioned between the first driven journal and said other end of the first main rotor section for providing thermal insulation between said other end of the first main rotor section and the first driven journal;

a second thermal insulation element having significantly lower thermal conductivity than said second driven journal and said other end of the second main rotor section and being mechanically positioned between the second driven journal and said other end of the second main rotor section for providing thermal insulation between said other end of the second main rotor section and the second driven journal;

a first axial bore extending through the first driven journal and through said first thermal insulation element and into the first main rotor section;

a second axial bore extending through the second driven journal and through said second thermal insulation element and into the second main rotor section;

a first liquid coolant feed tube extending along said first axial bore through said first driven journal and through said first thermal insulation element and into the first main rotor section for cooling said first main rotor section, said first thermal insulation element and said first driven journal;

a second liquid coolant feed tube extending along said second axial bore through said second driven journal and through said second thermal insulation element and into the second main rotor section for cooling said second main rotor section, said second thermal insulation element and said second driven journal; and a first mechanical interface between said one end of the first main rotor section and the first drive journal inhibiting thermal conduction of heat from said one end of the first main rotor section into the first drive journal and a second mechanical interface between said one end of the second main rotor section and the second drive journal inhibiting thermal conduction of heat from said one end of the second main rotor section into the second drive journal.

4. In a two-rotor continuous mixer of plastic materials, apparatus claimed in claim 3, further comprising:

means for flowing liquid coolant in contact with a major portion of a wall of the first axial bore in the first driven journal for providing a heat sink for the plurality of bearings in the driven journal assembly including said first driven journal; and means for flowing liquid coolant in contact with a major portion of a wall of the second axial bore in the second driven journal for providing a heat sink for the plurality of bearings in the driven journal assembly including said second driven journal.

5. In a two-rotor continuous mixer of plastic materials wherein the elongated main rotor section of each rotor is rotated in a mixing chamber defined within a mixer barrel, apparatus claimed in claim 4, further comprising:

said first and second axial bores extending into the first and second main rotor sections, respectively, to a respective first and second terminus of the first and second axial bores, said first and second terminus being positioned axially within the first and second main rotor sections closer to the respective drive end frame than an axial spacing between the mixer barrel and the respective drive end frame; and said first and second coolant feed tubes have respective discharges aimed toward the respective first and second terminus for directing liquid coolant against the respective terminus for providing a heat sink for the plurality of bearings in the drive journal bearing assembly for the respective first and second drive journals.

6. In a two-rotor continuous mixer of plastic materials wherein the elongated first and second main rotor sections of each rotor is rotated in a mixing chamber defined within a mixer barrel, apparatus as claimed in claim 3, in which:

the respective drive and driven end frames are each spaced farther from said mixer barrel in relationship to sizes of said mixer and of said end frames than the spacings between a mixer barrel and end frames in a two-rotor continuous mixer of plastic materials of comparable sizes in the prior art for providing increased relative clearance between said mixer barrel and the respective drive and driven end frames through which circulation of ambient air can occur for providing increased thermal isolation between said mixer barrel and the respective drive and driven end frames.

7. In a two-rotor continuous mixer for plastic materials wherein each rotor includes an elongated main rotor section with a drive journal located near an upstream end of the main rotor section and a driven journal located near a downstream end of the main rotor section and wherein the main rotor sections of the two rotors are rotated about their respective rotational axes in a mixing chamber defined within a mixer barrel and wherein the drive and driven journals are rotationally supported by drive and driven bearing assemblies, respectively, such drive and driven bearing assemblies including drive and driven end frames, respectively, and wherein each of the drive and driven bearing assemblies includes a plurality of axially spaced bearings each having an inner race encircling a respective one of the journals and each having an outer race supported in a respective end frame, with rolling elements interposed between the inner and outer races for rotationally supporting the inner race within the outer race, apparatus for enabling the two-rotor continuous mixer to be operated for mixing plastic materials with such bearings being grease-lubricated, said apparatus comprising:

a grease fitting associated with each bearing for accommodating injection of grease as lubricant for the respective bearing;

two three-piece rotors each comprising a main rotor section mechanically separable from its respective drive and driven journals;

said drive and driven end frames being mechanically spaced from the mixer barrel at the upstream and downstream ends of the two main rotor sections;

means for inhibiting transfer of heat from the main rotor sections into their respective drive and driven journals;

liquid coolant feeding means extending through each driven journal and into each main rotor section to a position located upstream beyond an entrance into the mixing chamber through which plastic materials to be mixed are introduced into the mixing chamber;

said means for inhibiting transfer of heat from the main rotor section of each rotor into the driven journal for said rotor comprises a thermal isolation element positioned between the downstream end of the main rotor section and the driven journal;

at least one torque-transmitting element extending past said thermal insulation element for transmitting torque from the main rotor section to the driven journal; and said torque-transmitting element being formed from material having lower thermal conductivity than the thermal conductivity of material from which the main rotor section is formed and also having lower thermal conductivity than the material from which the driven journal is formed.

8. In a two-rotor continuous mixer for plastic materials wherein each rotor includes an elongated main rotor section with a drive journal located near an upstream end of the main rotor section and a driven journal located near a downstream end of the main rotor section and wherein the main rotor sections of the two rotors are rotated about their respective rotational axes in a mixing chamber defined within a mixer barrel and wherein the drive and driven journals are rotationally supported by drive and driven bearing assemblies, respectively, such drive and driven bearing assemblies including drive and driven end frames, respectively, and wherein each of the drive and driven bearing assemblies includes a plurality of axially spaced bearings each having an inner race encircling a respective one of the journals and each having an outer race supported in a respective end frame, with rolling elements interposed between the inner and outer races for rotationally supporting the inner race within the outer race, apparatus for enabling the two-rotor continuous mixer to be operated for mixing plastic materials with such bearings being grease-lubricated, said apparatus comprising:

a grease fitting associated with each bearing for accommodating injection of grease as lubricant for the respective bearing;

two three-piece rotors each comprising a main rotor section mechanically separable from its respective drive and driven journals;

said upstream and downstream ends of each main rotor section of each rotor extending out of upstream and downstream portions of said mixer barrel;

said drive and driven end frames being mechanically spaced from the mixer barrel at the upstream and downstream ends of the two main rotor sections;

means for inhibiting transfer of heat from the two main rotor sections into their respective drive and driven journals;

said means for inhibiting transfer of heat including four disconnectable couplings;

said four disconnectable couplings including first and second couplings located between said upstream and downstream ends, respectively, of one main rotor section and its respective drive and driven journals and third and fourth couplings located between said upstream and downstream ends, respectively, of the other main rotor section and its respective drive and driven journals;

liquid coolant feeding means extending through each driven journal and into each main rotor section to a position located upstream beyond an entrance into the mixing chamber through which plastic materials to be mixed are introduced into the mixing chamber;

said means for inhibiting transfer of heat from the main rotor section of each rotor into the driven journal for said rotor comprising a thermal isolation element positioned between the downstream end of each main rotor section and its respective driven journal; and each of said thermal isolation elements having thermal conductivity significantly lower than the respective adjacent downstream end of the respective main rotor section.

* * * * *